United States Patent
LoGuidice

(10) Patent No.: US 7,089,658 B2
(45) Date of Patent: Aug. 15, 2006

(54) CLAMP REMOVER

(75) Inventor: John LoGuidice, Lake Mary, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 376 days.

(21) Appl. No.: 10/706,788

(22) Filed: Nov. 12, 2003

(65) Prior Publication Data

US 2005/0098335 A1   May 12, 2005

(51) Int. Cl.
*B23P 19/00* (2006.01)
*B25B 7/04* (2006.01)
*B25B 7/12* (2006.01)
*F16L 3/00* (2006.01)

(52) U.S. Cl. .......................... 29/764; 29/758; 29/762; 248/63

(58) Field of Classification Search .......... 29/745–748, 29/758, 762, 770, 564.1, 564.3, 828, 764; 81/417, 347, 352–355, 300; 248/49–74.5; 174/35 R
See application file for complete search history.

(56) References Cited

U.S. PATENT DOCUMENTS

| | | | | |
|---|---|---|---|---|
| 936,980 A * | 10/1909 | Bing | ............................ | 81/321 |
| 1,602,704 A * | 10/1926 | Renari | ......................... | 29/246 |
| 2,020,052 A * | 11/1935 | Fischer | ........................ | 29/246 |
| 3,111,870 A * | 11/1963 | Anderson | ..................... | 81/9.3 |
| 4,939,821 A | 7/1990 | Frank, Jr. | | |
| 5,050,273 A | 9/1991 | Okura | | |
| 5,142,745 A | 9/1992 | Setty et al. | | |
| 5,253,554 A * | 10/1993 | Riera et al. | .................... | 81/9.3 |
| 5,590,573 A * | 1/1997 | Detable | ........................ | 81/9.3 |
| 5,666,865 A * | 9/1997 | Ito | ............................... | 81/3.8 |
| 5,845,393 A * | 12/1998 | DePaiva | ....................... | 29/751 |
| 6,128,975 A * | 10/2000 | Schley et al. | ................. | 81/9.3 |
| 6,581,251 B1 | 6/2003 | Malin | | |

* cited by examiner

*Primary Examiner*—Peter Vo
*Assistant Examiner*—Livius Radu Cazan
(74) *Attorney, Agent, or Firm*—Lee & Hayes, PLLC

(57) ABSTRACT

A clamp remover is disclosed. In one example of the present embodiments, a wire clamp remover includes a first engaging member configured to engage a clamp and a second engaging member configured to engage the clamp. In addition, the wire clamp remover also comprises a first interface member coupled to the first engaging member and a second interface member coupled to the second engaging member.

16 Claims, 7 Drawing Sheets

CLAMP REMOVER

BACKGROUND

In industries such as the telecommunication industry, it is common practice to use fixtures to secure aerial surface wires, electrical cables, service wires, cable lines, etc. ("wires") to fixed structures. Generally, the fixtures are commonly referred to as drop wire clamps, p-clamps, suspending wire clamps, etc. ("wire clamps") and are commonly employed in elevated environments to attach a wire to a fixed structure with a portion of the wire extending beyond the wire clamp into the structure. For example, wire clamps may secure wires to the outside of buildings at a point just short of the position in which the wires enter the building. In addition, wire clamps may also be utilized to secure wires to a columnar member, such as, for example, a pole, a tree trunk, and the like.

Due to being exposed to a variety of external conditions such as rain, snow, hail, wind, sun, and other types of adverse weather conditions, wires may need repaired or replaced over time, which often involves a technician removing the wire clamp to adjust and/or remove a sagging, damaged and/or severed wire.

SUMMARY

In one example of the present embodiments, a wire clamp remover is provided including a first engaging member configured to engage a clamp and a second engaging member configured to engage the clamp. In addition, the wire clamp remover also comprises a first interface member coupled to the first engaging member and a second interface member coupled to the second engaging member.

Other systems, methods, and/or products according to embodiments will be or become apparent to one with skill in the art upon review of the following drawings and detailed description. It is intended that all such additional systems, methods, and/or products be included within this description, be within the scope of the present invention, and be protected by the accompanying claims.

DESCRIPTION OF THE DRAWINGS

Various example aspects of present embodiments are described herein in conjunction with the following figures, wherein.

DESCRIPTION

Figure 1A:
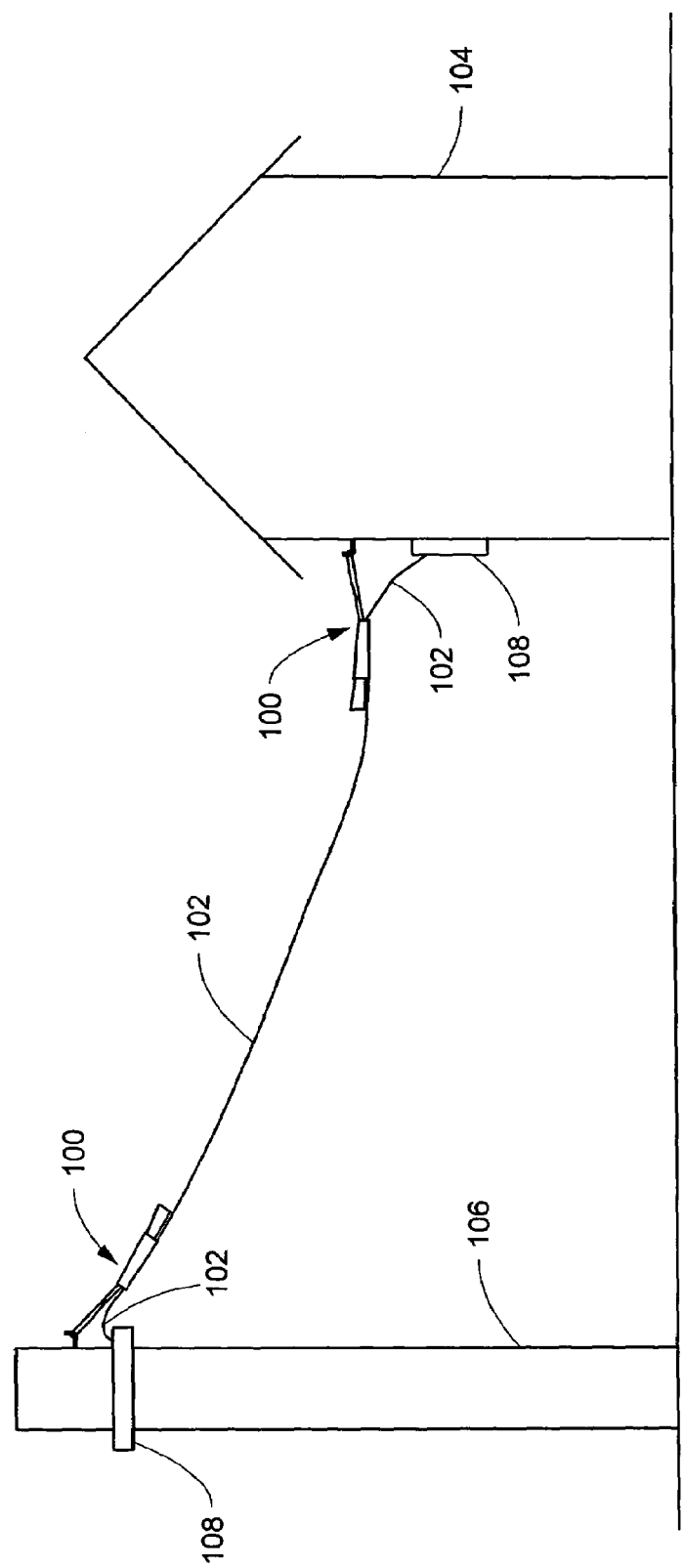
FIGS. 1A and 1B illustrate a diagram of an exemplary environment in which a wire clamp may be employed.

Referring now to the several drawings in which identical elements are numbered identically throughout, a description of the clamp remover now will be provided, in which exemplary embodiments are shown in the several figures. The clamp remover may, however, be embodied in many different forms and should not be construed as limited to the embodiments set forth herein.

All statements herein reciting example aspects of present embodiments are intended to encompass both structural and functional equivalents thereof. Moreover, it is intended that such equivalents include both currently known equivalents as well as equivalents developed in the future for performing the same function, regardless of structure. Thus, those skilled in the art will appreciate that the drawings presented herein and the like, represent conceptual views of illustrative structures which may embody the various example aspects of the clamp remover.

It can be appreciated that commercial entities and other organizations that employ workers in elevated environments are aware of the potential risks attendant upon work performed in such environments. In view of this awareness, commercial entities and other organizations devote time and resources to promoting the safety of workers performing work in elevated environments to make the performance of work as safe as possible. Promoting safety of workers in elevated environments may involve instituting training programs and/or providing workers with a variety of support devices, support systems, backup devices and systems, and/or other means that promote the stability and safety of workers in elevated environments. Despite the best efforts of an organization to enhance the safety of its workers and reduce the risk of falling from elevated structures, for example, it is nonetheless difficult to eliminate all risks to workers performing work on such elevated structures.

Redundant systems for promoting safety of workers on elevated utility structures may thus sometimes be used. Such redundant systems can sometimes be beneficial in addition to the myriad of existing support systems, methods, devices and/or other apparatus employed by workers on elevated structures to reduce or mitigate risks associated with falling from utility structures, for example.

In addition, those skilled in the art will appreciate that the term "wire(s)" as used herein may comprise aerial surface wires, electrical cables, service wires, cable lines, etc. Furthermore, the term "wire clamp" as used herein may comprise drop wire clamps, p-clamps, suspending wire clamps and/or any other fixture that may be employed to attach a wire to a structure with a portion of the wire extending beyond the wire clamp into the structure.

It is to be understood that the figures and descriptions of the present embodiments have been simplified to illustrate elements that are relevant for a clear understanding of the clamp remover, while eliminating, for purposes of clarity, other conventional elements of a clamp remover. For example, conventional clamp removers may include certain mounting brackets, latches, stops, straps and hinges that are not described herein. Those of ordinary skill in the art will recognize, however, that these and other elements may be desirable in a typical clamp remover. However, because such elements are well known in the art and because they do not facilitate a better understanding of the clamp remover, a discussion of such elements is not provided herein.

Also, in the claims appended hereto, any element expressed as a means for performing a specified function is to encompass any way of performing that function including, for example, a combination of elements that perform that function. Furthermore the invention, as defined by such means-plus-function claims, resides in the fact that the functionalities provided by the various recited means are combined and brought together in the manner that the claims called for. Therefore, any means that can provide such functionalities may be considered equivalents to the means shown herein.

Figure 1B:
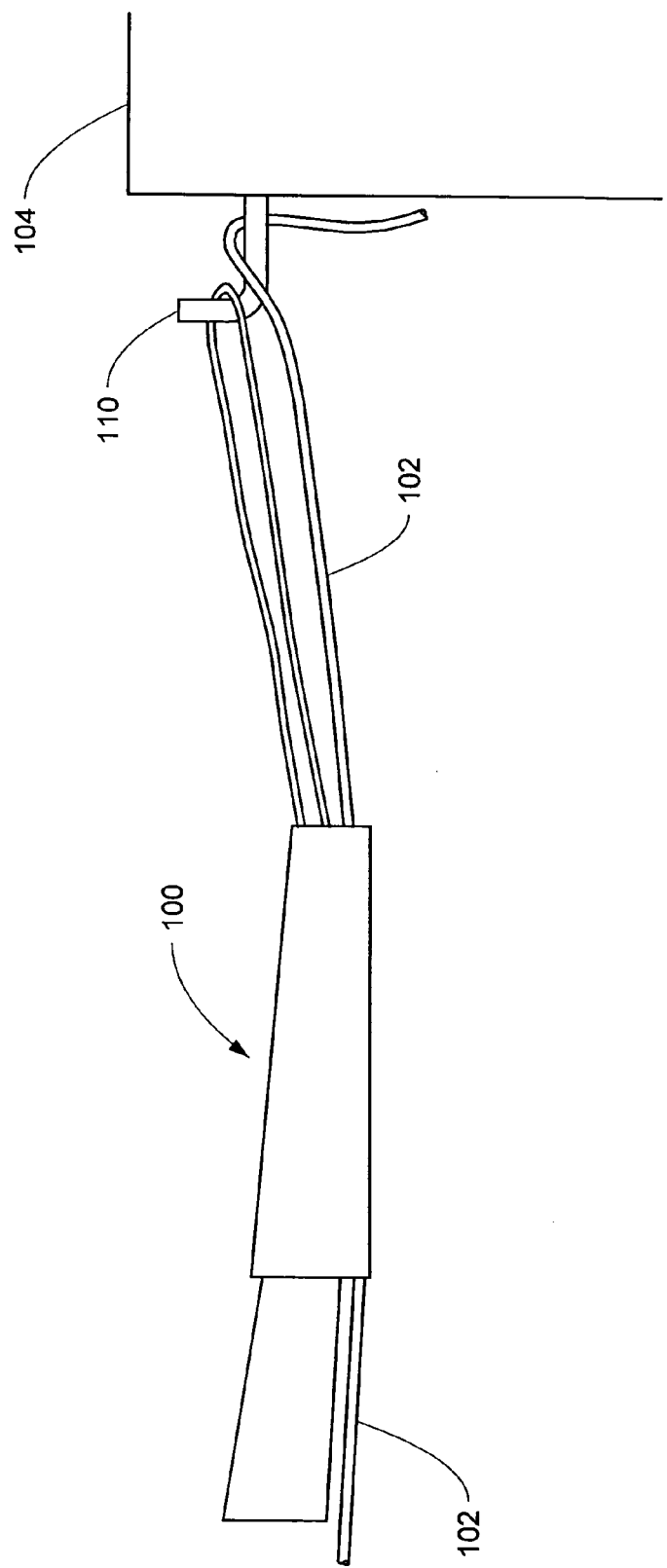

FIGS. 1A and 1B depict an example scenario involving a wire 102 spanning between a columnar member 106 and a fixed structure 104 located on the premises of a service subscriber. These figures show at least one wire clamp 100 is employed to secure the wire 102 to a hook 110 that is mounted to the columnar member 106 and the outside of the fixed structure 104. The hook 110 is located at a point just short of the position in which the wire 102 enters the fixed structure 104 and/or enters a network interface 108 mounted to the fixed structure 104 and/or the columnar member 106.

The columnar member 106 may be a pole and/or a tree trunk, and the fixed structure 104 may be a subscriber's commercial building, industrial site and/or residence. Those skilled in the art will appreciate that the network interface 108 may be any point of interconnection between a communication facility, such as, for example, a telephone company, and terminal equipment, protective apparatuses and/or wiring located on the columnar member 106 and/or within the fixed structure 104.

Figure 2A:
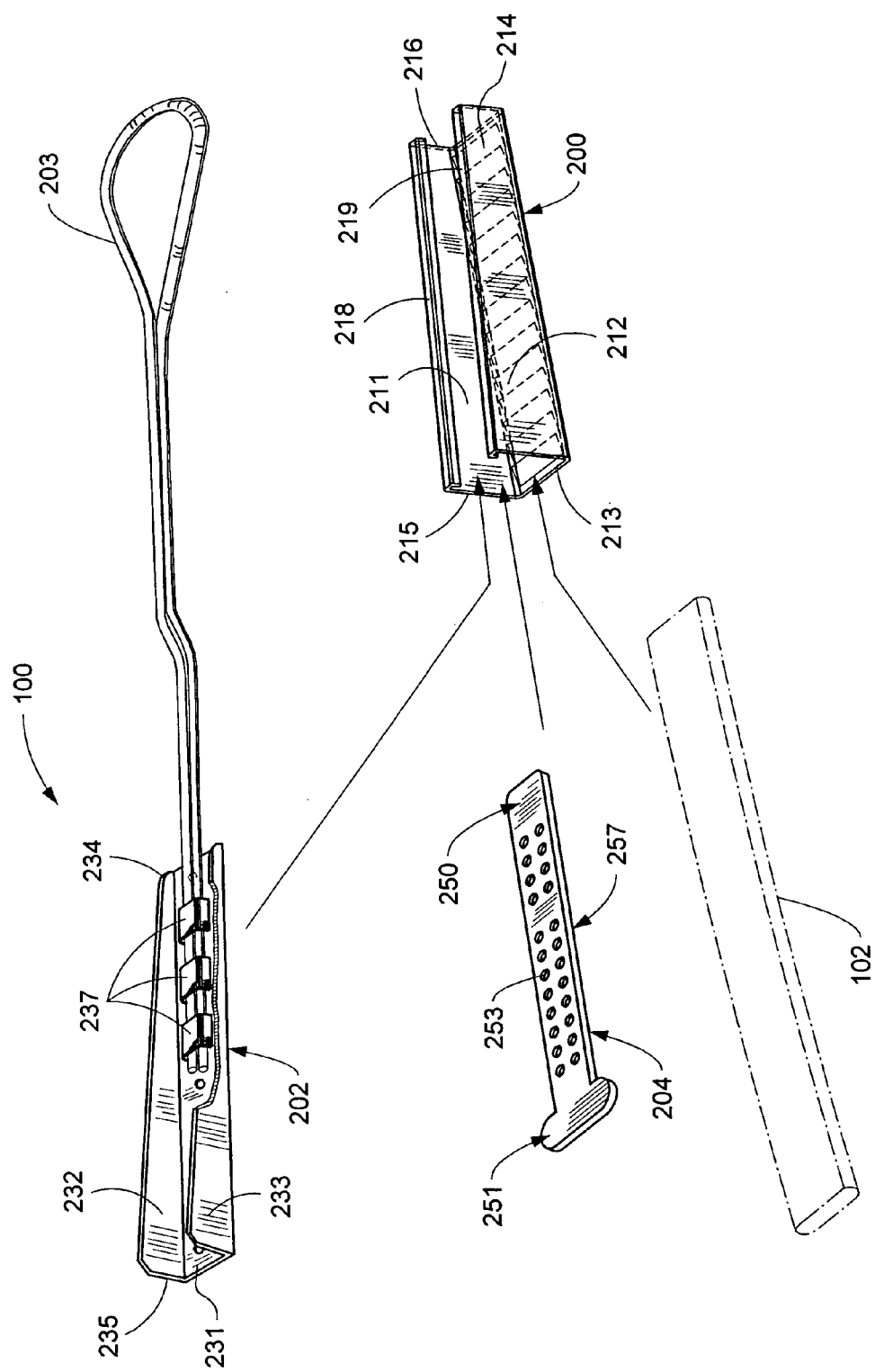
FIG. 2A illustrates a diagram of an example of a wire clamp.

FIG. 2A illustrates an exploded view of a wire clamp 100 that may comprise a shell 200, a wedge 202 and/or a shim 204 that function in concert to secure the wire 102 to the columnar member 106 and/or the fixed structure 104. In addition, wire clamps 100 may come in varying sizes to accommodate the various widths and thickness of wires 102.

The shell 200 is formed as an elongated, open-ended member, having side walls 211 and 212 interconnected by a bottom 213 essentially defining a U-shaped cross section. The bottom 213 maybe formed with a stepped or grooved surface 214 extending the length of the bottom 213. This stepped or grooved surface 214 forms a series of transverse teeth that are shaped to engage the wire 102. The walls 211 and 212 are tapered from a wide end 215 to a narrow end 216. The upper edges of the walls 211 and 212 are bent toward one another to form a pair of rails 218 and 219 with downwardly open channels along the upper edge of the walls 211 and 212. The rails 218 and 219 are parallel to one another and are formed, shaped and sized to receive corresponding walls 232 and 233 of the wedge 202, hereafter described.

The wedge 202 is formed with an elongated base 231 with opposite upwardly extending side walls 232 and 233 at its longitudinally edges that taper from one end 234 to a wider other end 235. The side walls 232 and 233 are spaced apart and shaped to slide in the rails 218 and 219 of the shell 200. The elongated base 231 is provided with a series of spaced crimps 237 that are shaped and sized to receive the engaging bail 203 of the wedge 202. The engaging bail 203 may be configured to interface with the hook 110 that may be mounted to the columnar member 106 and/or the fixed structure 104.

The shim 204 extends longitudinally off the wedge 202 and is approximately the same width as the wedge 202. In the illustrated embodiment (shown in FIG. 2B), the forward portion 250 of the shim 204 extends forwardly beyond the one end 234 of the wedge 202. The rear portion 251 of the shim 204 is formed with a laterally extending tab having a width greater than the width of the shell 200 to limit inward movement of the wedge 202 and the shim 204 into the shell 200. The shim 204 is also provided with a series of punchholes 253 for frictionally engaging a length of the wire 102 positioned between the shim 204 and the bottom of the shell 200. The walls of the punchholes 253 project downwardly to form projecting and engaging elements in the lower surface 257 of the shim 204.

Figure 2B:
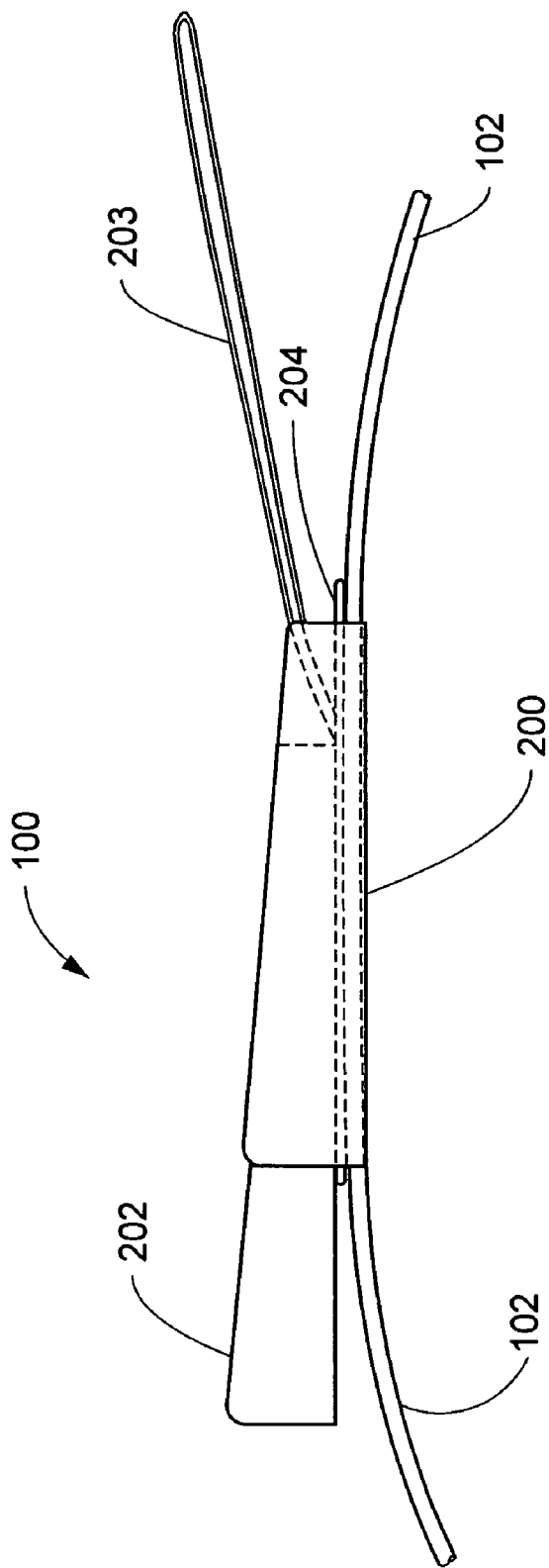
FIG. 2B illustrates a diagram of an example of the wire clamp in an engaged position.

FIG. 2B illustrates the wire 102, the shell 200, the wedge 202 and the shim 204 in an engaged position. The wedge 202 is slid longitudinally into the shell 200, thus securing the wire 102 between the shim 204 and the bottom of the shell 200. A technician slides the wedge 202 longitudinally into the shell 200. The bail 203 of the wedge 202 is coupled to the hook 110, thereby causing the weight of the wire 102 to act as a force that longitudinally engages the wedge 202 with the shell 200.

Figures 3A, 3B, 3C:
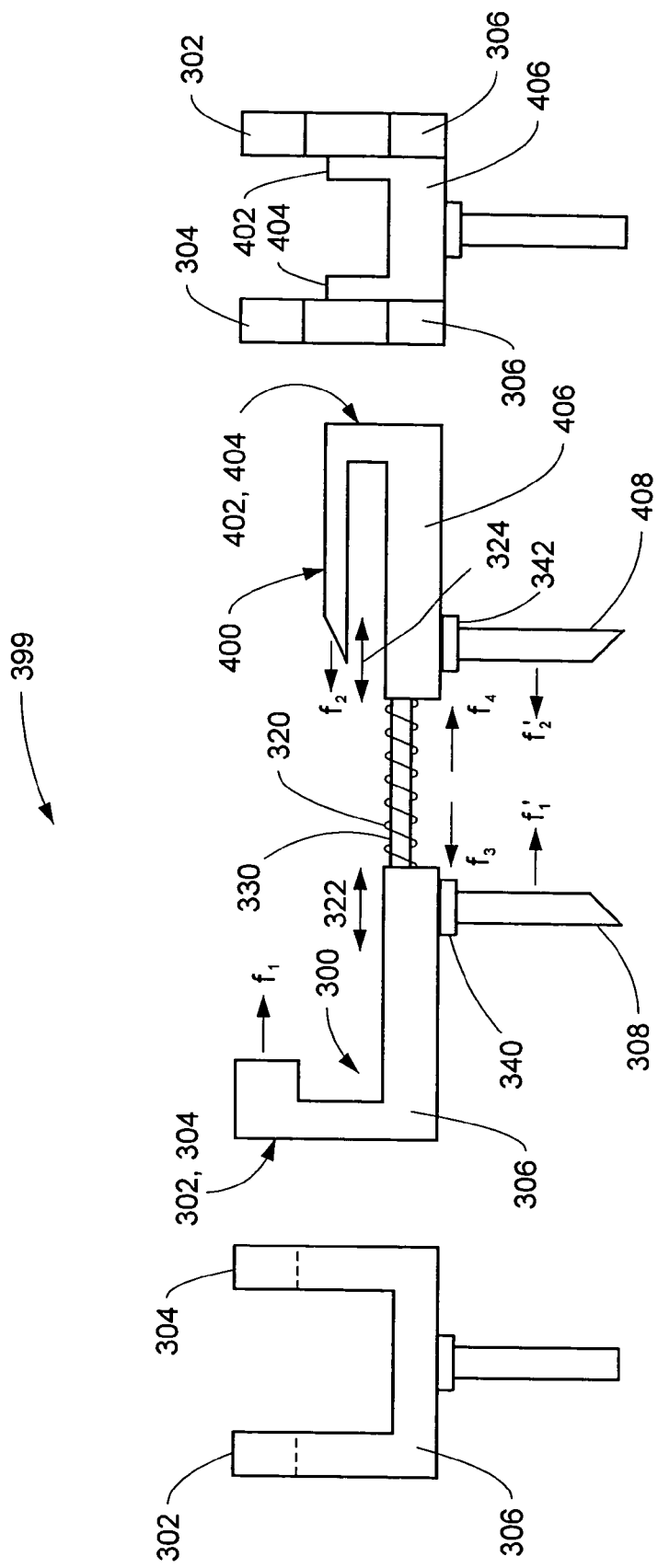
FIG. 3A is an end view of an exemplary embodiment of a clamp remover.
FIG. 3B is a side view of an exemplary embodiment of a clamp remover.
FIG. 3C is an end view of an exemplary embodiment of a clamp remover.
Figure 4:
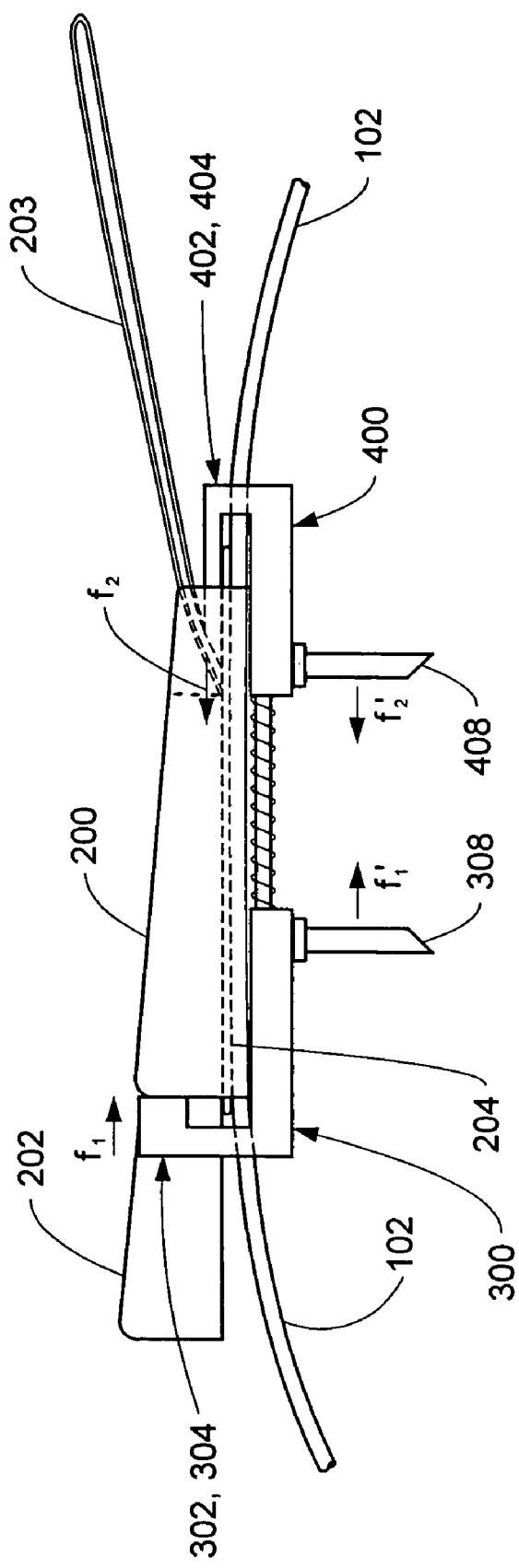
FIG. 4 illustrates a diagram of an example of a clamp remover engaging a wire clam.

Referring now to FIGS. 3 and 4, which depict a clamp remover 399 (shown in FIGS. 3A, 3B and 3C) and the clamp remover 399 engaging a wire clamp 100 (shown in FIG. 4). In addition, the clamp remover 399 may come in varying sizes to accommodate the various size wire clamps 100.

FIG. 3A, is an end view of an exemplary embodiments of a wire clamp remover 399. FIG. 3B is a side view of an exemplary embodiment of a clamp remover 399. FIG. 3C is an end view of an exemplary embodiment of a clamp remover 399. The wire clamp remover 399 may be formed from a variety of suitable materials that can withstand various outdoor environmental conditions and the stress and/or strain caused by varying multi-directional load forces. As used herein, "environmental conditions" include, but are not limited to, a wide range of ambient temperatures, humidity, moisture, rain, sleet, snow, ice, and airborne or windblown sand, dust and dirt prevalent in outdoor environments.

The wire clamp remover 399 may be famed from any suitable engineering material with the above-mention environmentally-resistant and/or strength properties such as, for example, metal, alloy, plastic, or ceramic used in the fabrication of machinery, machinery components, structural shapes, tools, instruments, and other items. Their hardness, strength, machinability, dimensional stability, nonflanunability, and resistance to corrosion, acids, solvents, and heat may characterize the properties of such suitable engineering materials. Examples of such suitable engineering materials include, but are not limited to, metals and alloys such as aluminum, beryllium, brass, bronze, cast iron, copper, lead, magnesium, steel, tantalum, zinc, zirconium, and various other alloys; ceramics such as glass and porcelain; and plastics such as ABS resin, acetal resin, acrylic resin, fluorocarbon polymer, nylon, phenolformaldehyde resin, polybutilene terephthalate, polycarbonate, polyethylene, polyphenylene oxide, polypropylene, polystyrene, polyvinyl chloride, reinforced plastics (FRP), polymers, rubber and ureaformaldehyde resin. The wire clamp remover 399 is formed from any of the engineering materials recited above, and/or any combinations thereof, with appropriate coatings adequate to withstand outdoor environmental conditions. The wire clamp remover 399 is formed of aluminum, stainless steel or G90 galvanized steel having a durable finish coating, such as a polyurethane powder coating.

The wire clamp remover 399 includes a first engaging member 300 configured to engage the wire clamp 100. The first engaging member 300 is formed as an elongated, open-ended member, having side walls 302 and 304 interconnected by a base 306 essentially defining a U-shaped cross section. The upper portions of the walls 302 and 304 are shaped to engage and apply a first force f1 against the shell 200 of the wire clamp 100 as shown in FIG. 4.

The wire clamp remover 399 includes a second engaging member 400 configured to engage the wire clamp 100. The second engaging member 400 is formed as an elongated, open-ended member, having side walls 402 and 404 interconnected by a base 406 essentially defining a U-shaped cross section. The upper portions of the walls 402 and 404 are shaped to engage and apply a second force f2 against the wedge 202 of the wire clamp 100 as shown in FIG. 4. The first force f1 and the second force f2 may be in opposition to one another.

The wire clamp remover 399 also includes a first interface member 308 coupled to the base 306 of the first engaging member 300. According to this embodiment, the first interface member 308 is integrated into the design of the first engaging member 300. In other embodiments, the first interface member is a separate and distinct element that is separately mounted to the first engaging member by fastening means such as, for example, rivets, bolts, screws, various crimping methodologies and/or various welding methodologies. In various aspects of the present embodiments, the first interface member is formed into a rectangular member, a columnar post and/or any other shape suitable for bearing loads associated with varying multi-directional forces.

The first interface member 308 is coupled to an actuating member 500 that is capable of providing a third force f2' (discussed herein below in conjunction with FIG. 5). As shown in FIG. 4, the first interface member 308 transfers the third force f2' to the first engaging member 300 and thus cause the upper portions of walls 302 and 304 to apply the first force f1 against the shell 200 of the wire clamp 100.

The wire clamp remover 399 also includes a second interface member 408 coupled to the base 406 of the second engaging member 400. According to this embodiment, the second interface member 408 is integrated into the design of the second engaging member 400. In other embodiments, the second interface member 408 is a separate and distinct element that is separately mounted to the second engaging member 400 by fastening means such as, for example, rivets, bolts, screws, various crimping methodologies and/or various welding methodologies. Like the first interface member 308, the second interface member 408 is formed into a rectangular member, a columnar post and/or any other shape suitable for bearing loads associated with varying multi-directional forces.

The second interface member 408 is coupled to an actuating member 500 that is capable of providing a fourth force f2' (discussed hereinbelow in conjunction with FIG. 5). As shown in FIG. 4, the second interface member 408 transfers the fourth force f2' to the second engaging member 400 and thus cause the upper portions of walls 402 and 404 to apply the second force f2 against the wedge 202 of the wire clamp 100.

The wire clamp remover 399 also includes a third interface member 330 that couples the first engaging member 300 to the second engaging member 400. According to this embodiment, the third interface member 330 is integrated into the design of the first engaging member 300 and/or the second engaging member 400. In other embodiments, the third interface member 330 is a separate and distinct element that is separately mounted to the first engaging member 300 and/or the second engaging member 400 by fastening means such as, for example, rivets, bolts, screws, various crimping methodologies and/or various welding methodologies.

In various aspects of the present embodiments, the third interface member is formed into rails with upwardly open channels. These rails are parallel to one another and maybe formed, shaped and sized to receive corresponding walls of the first engagement member and/or the second engagement member such that the first engagement member and/or the second engagement member bidirectionally slide along the third interface member.

The wire clamp remover 399 also includes a reset member 320. In various example aspects of this embodiment, the reset member is coupled to the first engaging member and/or the second engaging member, or the reset member may, for example, be coupled to the first interface member and/or the second interface member.

The reset member 320 comprises a biased, a hydraulic and/or a pneumatic member. The biased element may include but is not limited to an air, coil, helical, leaf and/or torsional spring. The potential energy of the biased, hydraulic and/or pneumatic member is at a maximum when an applied force compresses the reset member 320 to its shortest length without causing permanent deformation, thus causing the reset member 320 to be in a "charged" condition. The reset member 320 may be subject to such a compressive force when the first engaging member 300, the first interface member 308, the second engaging member 400 and/or the second interface member 409 are actuated by forces f1, f1', f2 and f2' respectively. Once charged, the reset member 320 is released and thus exerts a force f3 on the first engaging member 300 and/or the first interface member 308 and exert a force f4 on the second engaging member 400 and/or the second interface member 409, thereby disengaging the first engaging member 300 and/or the second engaging member 400 from the wire clamp 100.

The wire clamp remover 399 also includes a first support member 340 that is coupled to the first engaging member 300 and the first interface member 308 and a second support member 342 that is coupled to the second engaging member 400 and the second interface member 408. The first support member 340 and the second support member 342 are formed from a variety of suitable materials that can withstand various outdoor environmental conditions as well as the stress and/or strain caused by varying multi-directional load forces.

According to the exemplary embodiment, support member 340 and the second support member 342 are formed from a natural, synthetic, and/or modified high polymer with elastic properties (e.g., rubber) in order to relieve some of the stress and strain that the first interface member 308 and second interface member 408 may bear when forces f1', f2', f3, and f4 are applied.

Figure 5:
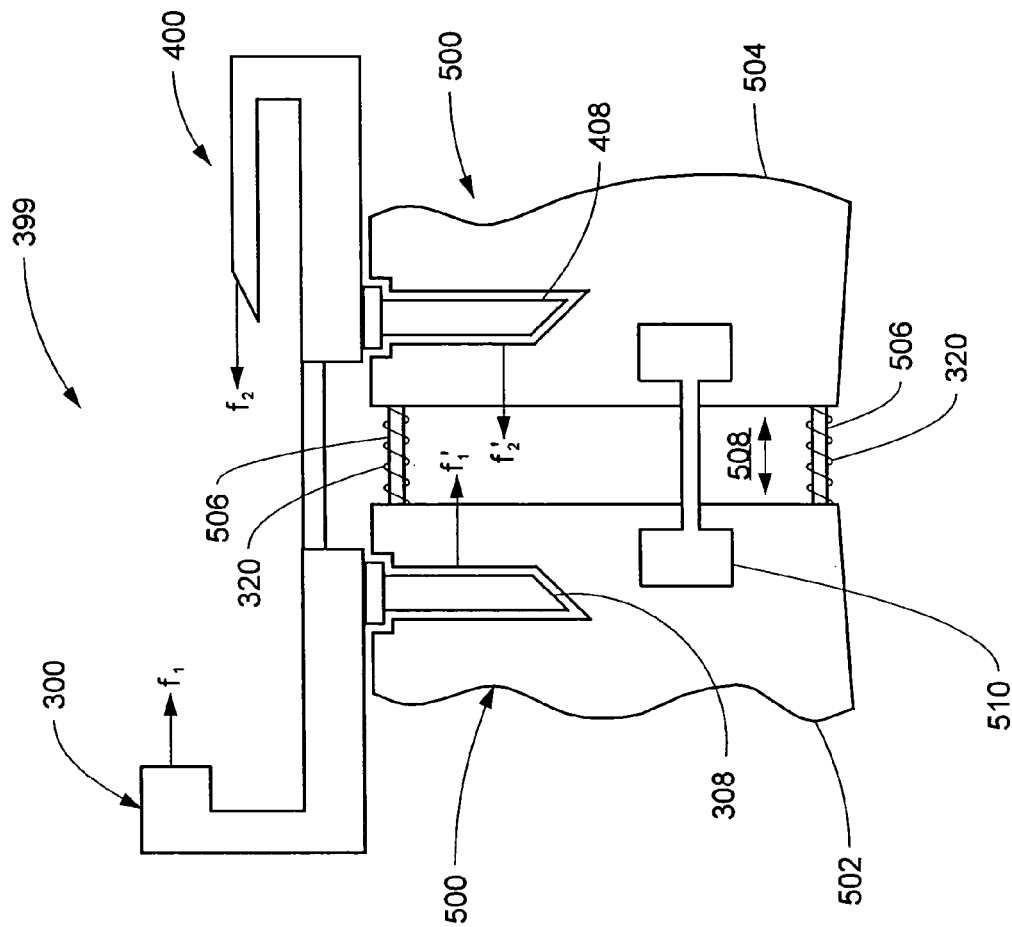
FIG. 5 illustrates a diagram of a wire clamp remover including an actuating member.

Referring now to FIG. 5, the wire clamp remover 399 includes an actuating member 500 configured to provide the third force f1' and the fourth force f2', which may be in opposition to one another. In addition, the actuating member 500 includes a first cavity 502 that is configured to receive the first interface member 308 and a second cavity 504 that is configured to receive the second interface member 408. The first cavity 502 and the second cavity 504 transfer and/or generate the third force f1' and the fourth force f2' respectively. In addition, the third force f1' may be applied to the first interface member 308 and the fourth force f2' maybe applied to the second interface member 408.

The actuating member 500 comprises the reset member 320, wherein the reset member 320 is configured to disengage the first engaging member 300 and the second engaging member 400 from the clamp 100. In addition, the actuating member 500, includes a force generating member and/or a force transferring member (shown as reference numeral 510). FIG. 5 shows the force generating member and/or the force transferring member 510 is coupled to the first cavity 502 and to the second cavity 504. The force generating member 510 and/or the force transferring member 510 may be locally and/or remotely controlled and may comprise at least one mechanical member, electromechanical member, biased member, hydraulic member and/or pneumatic member. In addition, the force generating member 510 is capable of generating the third force f1' and the fourth force f2', and the force transferring member 510 is capable of transferring the third force f1' to the first interface member 308 and the fourth force f2' to the second interface member 408. For example, the force transferring member 510 may transfer forces f1' and f2' that are generated by a technician squeezing the first cavity 502 against the second cavity 504. In another embodiment, the biased element includes an air, coil, helical, leaf and/or torsional spring.

The actuating member 500 also comprises at least one linking member 506 that is coupled to the first cavity 502 and the second cavity 504. According to this exemplary embodiment, the linking member 506 is integrated into the design of the first cavity 502 and/or the second cavity 504. In other embodiments, the linking member 506 is a separate and distinct element that is separately mounted to the first cavity 502 and/or the second cavity 504 by fastening means such as, for example, rivets, bolts, screws, various crimping methodologies and/or various welding methodologies.

The linking member 506 is formed into rails with upwardly open channels. These rails are parallel to one another and are formed, shaped and sized to receive corresponding walls of the first cavity 502 and/or the second cavity 504 such that the first cavity 502 and/or the second cavity member 504 bi-directionally slide along the linking member in directions shown by arrow 508.

While several example aspects of present embodiments have been described, it should be apparent, however, that various modifications, alterations and adaptations to those embodiments may occur to persons skilled in the art with the attainment of some or all of the advantages of the present embodiments. The example aspects are therefore intended to cover all such modifications, alterations and adaptations without departing from the scope and spirit of the present embodiments as defined by the appended claims.

What is claimed is:

1. A clamp remover, comprising:
a first engaging member configured to engage a clamp, wherein the first engaging member has a first side wall and a second side wall to apply a first force against a shell of the clamp;
a second engaging member configured to engage the clamp, wherein the second engaging member has a first side wall and a second side wall to apply a second force against a wedge of the clamp;
a first interface member coupled to the first engaging member;
a second interface member coupled to the second engaging member;
an actuating member coupled to the first interface member and to the second interface member;
wherein the actuating member provides at least one of a third force and a fourth force, wherein the third force is transferred from the first interface member to the first engaging member by causing the first side wall and the second side wall of the first engaging member to apply the first force against the shell of the clamp and wherein the fourth force is transferred from the second interface member to the second engaging member causing the first side wall and the second side wall of the second engaging member to apply the second force against the wedge of the clamp;
wherein the actuating member defines a first cavity and a second cavity, wherein the first cavity receives the first interface member, and wherein the second cavity receives the second interface member;
wherein the actuating member comprises a reset member, wherein the reset member is coupled to at least one of the first engaging member, the second engaging member, the first interface member and the second interface member;
wherein the actuating member disengages at least one of me first engaging member, the second engaging member, the first interface member, and me second interface member from the clamp; and
wherein the actuating member comprises at least one of a force generating member and a force transferring member, wherein at least one of the force generating member and the force transferring member are coupled to the first cavity and to the second cavity.

2. The clamp remover of claim 1, wherein the clamp is a wire clamp.

3. The clamp remover of claim 1, wherein the clamp remover is constructed of a material selected from the group consisting of glass fibers, metals, alloys, plastics, and ceramics.

4. The clamp remover of claim 1, wherein the force generating member is capable of generating the third force and the fourth force; and wherein the force transferring member is capable of transferring the third force to the first interface member and the fourth force to the second interface member.

5. The clamp remover of claim 4, wherein the reset member is coupled to at least one of the first engaging member and the second engaging member.

6. The clamp remover of claim 4, wherein the reset member is coupled to at least one of the first interface member and the second interface member.

7. The clamp remover of claim 4, wherein the reset member comprises at least one of a biased member, a hydraulic member and a pneumatic member.

8. The clamp remover of claim 1, further comprising:
a first support member coupled to the first engaging member and the first interface member; and
a second support member coupled to the second engaging member and the second interface member.

9. The clamp remover of claim 8, wherein at least one of the first support member and the second support member includes an elastic material selected from the group consisting of a natural high polymer, a synthetic high polymer and a modified high polymer.

10. The clamp remover of claim 1, further comprising a third interface member, wherein the third interface member is coupled to the first engaging member and the second engaging member.

11. The clamp remover of claim 1, wherein the first engaging member comprises a third interface member and wherein the third interface member couples the first engaging member to the second engaging member.

12. The clamp remover of claim 1, wherein the second engaging member comprises a third interface member and wherein the third interface member couples the first engaging member to the second engaging member.

13. The clamp remover of claim 1, wherein at least one of the force generating member and the force transferring member, include at least one of a mechanical member, an electromechanical member, a biased member, a hydraulic member and a pneumatic member.

14. The clamp remover of claim 1, the third force is applied to the first interface member and the fourth force is applied to the second interface member.

15. The clamp remover of claim 1, wherein the actuating member is one of locally controlled at the clamp remover and remotely controlled away from the clamp remover.

16. The clamp remover of claim 1, wherein the third force is in opposition to the fourth force and the fourth force is in opposition to the third force.

* * * * *